United States Patent [19]

Scholl et al.

[11] Patent Number: 4,918,235
[45] Date of Patent: Apr. 17, 1990

[54] 1,5-DIAMINOHEPTANOL-1,6,

[75] Inventors: Hans-Joachim Scholl; Josef Pedain, both of Cologne, Fed. Rep. of Germany

[73] Assignee: Bayer Aktiengesellschaft, Leverkusen, Fed. Rep. of Germany

[21] Appl. No.: 227,224

[22] Filed: Aug. 2, 1988

[30] Foreign Application Priority Data

Aug. 6, 1987 [DE] Fed. Rep. of Germany ....... 3726049

[51] Int. Cl.$^4$ .............................................. C07C 91/04
[52] U.S. Cl. .................................................. 564/503
[58] Field of Search ......................................... 564/503

[56] References Cited

U.S. PATENT DOCUMENTS

| 2,931,804 | 4/1980 | Spivack | 564/503 X |
| 4,035,213 | 7/1977 | Thoma et al. | 156/231 |
| 4,523,003 | 6/1985 | Bezwada | 528/58 |
| 4,613,527 | 9/1986 | Potter et al. | 427/412 |

OTHER PUBLICATIONS

Abstract of German 3,425,814.

Primary Examiner—Robert V. Hines
Attorney, Agent, or Firm—Joseph C. Gil; Thomas W. Roy

[57] ABSTRACT

The present invention is directed to a new chemical compound, 1,5-diaminoheptanol-6, which corresponds to the formula

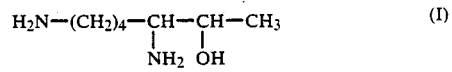

$$H_2N-(CH_2)_4-\underset{NH_2}{CH}-\underset{OH}{CH}-CH_3 \quad (I)$$

The present invention is additionally directed to a process for the preparation of 1,5-diaminoheptanol-6 by reacting L-lysine in its free form and/or in the form of its HCl salt, with acetic acid anhydride in the presence of a tertiary organic amino base and with the addition of a 4-aminopyridine derivative, hydrogenating the resulting 1,5-bisacetaminohepthanone-6 to 1,5-bisacetaminoheptanol-6, forming a salt of 1,5-diaminoheptanol-6 by treating 1,5-bisacetaminoheptanone-6 with a mineral acid and isolating the free amine by treating the 1,5-diaminoheptanol-6 salt of a mineral acid with a strong base.

Finally, the present invention is directed to the use of 1,5-diaminoheptanol-6 as at least a portion of the chain lengthening agent for the preparation of polyurethane plastics by the isocyanate polyaddition process.

1 Claim, No Drawings

1,5-DIAMINOHEPTANOL-1,6

BACKGROUND OF THE INVENTION

1. Field of the Invention

This invention relates to the new chemical compound, 1,5-diaminoheptanol-6, to a process for its preparation from L-lysine and to its use as chain lengthening agent for the preparation of polyurethane polyureas by the isocyanate polyaddition process.

2. Description of the Prior Art

It is known in the prior art to subject dissolved polyurethane polyurea resins of a linear structure to a cross-linking reaction on a substrate using melamine- or urea-formaldehyde resins. The acceptor groups for the methylol groups are the NH groups from the urethane and urea groups of the polymer chain. The disadvantage of this cross-linking reaction is that it generally requires high temperatures in the region of about 150° to 170° C. for sufficient cross-linking. Even though the incorporation of hydrazine into the polymer chain or into amide groups in side positions (according to DE-A 2,457,387 or DE-A 3,345,071) has improved the stoving conditions, further improvements are necessary.

Accordingly, it is an object of the present invention to provide a chain-extender which may be used in the production of polyurethane polyureas such that they may be cross-linked e.g. with formaldehyde resins under very mild conditions. It is an additional object of the present invention to prepare cross-linked coatings or films which are chemically resistant on substrates such as metals, plastics, paper or wood.

It has been discovered that these objectives may be achieved by using the chain extender set forth hereinafter for the production of polyurethane polyureas.

SUMMARY OF THE INVENTION

The present invention is directed to a new chemical compound, 1,5-diaminoheptanol-6, which corresponds to the formula $$H_2N-(CH_2)_4-CH-CH-CH_3 \quad (I)$$
$$\qquad\qquad\quad | \quad\ \ |$$
$$\qquad\qquad\ \ NH_2\ \ OH$$

The present invention is additionally directed to a process for the preparation of 1,5-diaminoheptanol-6 by reacting L-lysine in its free form and/or in the form of its HCl salt, with acetic acid anhydride in the presence of a tertiary organic amine base and with the addition of a 4-aminopyridine derivative, hydrogenating the resulting 1,5-bisacetaminoheptanone-6 to 1,5-bisacetaminoheptanol-6, forming a salt of 1,5-diaminoheptanol-6 by treating 1,5-bisacetaminoheptanone-6 with a mineral acid and isolating the free amine by treating the 1,5-diaminoheptanol-6 salt of a mineral acid with a strong base.

Finally, the present invention is directed to the use of 1,5-diaminoheptanol-6 as at least a portion of the chain lengthening agent for the preparation of polyurethane plastics by the isocyanate polyaddition process.

DETAILED DESCRIPTION OF THE INVENTION

The process for the preparation of 1,5-diaminoheptanol-6 is characterized in that L-lysine either in its free form and/or in its hydrochloric acid salt form is reacted with acetic acid anhydride in the presence of a tertiary organic amine base and with the addition of a 4-aminopyridine derivative according to DE-A 3,425,814 to produce 1,5-bisacetaminoheptanone-6. The product obtainable by this method is hydrogenated to 1,5-bisacetaminoheptanol-6 which is then converted into the salt of 1,5-diaminoheptanol-6 by hydrolysis in an aqueous mineral acid and isolated as the free amine, 1,5-diaminoheptanol-6, by treatment with a strong base.

An embodiment given by way of example of the process according to the invention is illustrated below by the following scheme of formulae:

$$H_2N-(CH_2)_4-CH-COOH \times HCl + CH_3-\overset{\overset{O}{\|}}{C}-O-\overset{\overset{O}{\|}}{C}-CH_3$$
$$\qquad\qquad\qquad\quad |$$
$$\qquad\qquad\qquad NH_2$$

lysine hydrochloride        acetic acid anhydride

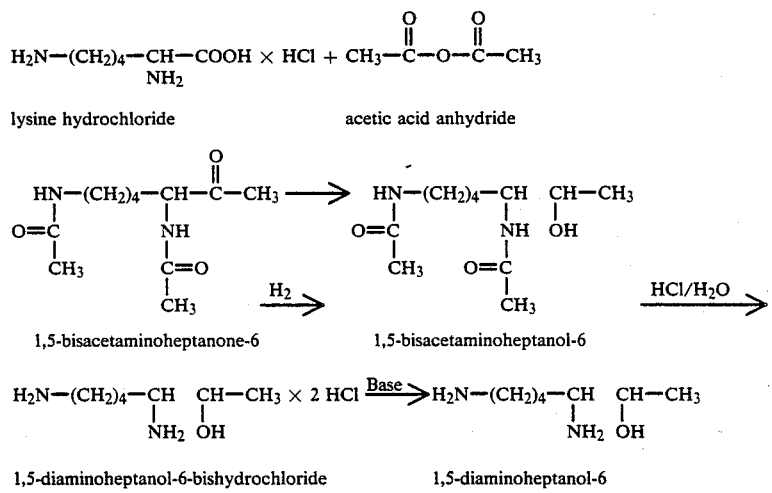

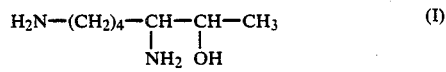

1,5-Bisacetaminoheptanone-6, which is obtained in the first stage according to DE-A 3,425,814, is hydrogenated in the next stage of the process according to the invention to convert the keto group to a hydroxyl group. The hydrogenation conditions are known, for example, using water as solvent, Raney nickel as hydrogenation catalyst and conducting the reaction at temperatures of about 50° to 150° C. and a hydrogen pressure of about 20 to 50 bar. Crude products of the first stage freed from triethylamine hydrochloride and low boiling constituents may, of course, also be used for the hydrogenation stage.

The resulting aqueous solution of 1,5-bisacetaminoheptanol-6 may be used directly for hydrolysis in acid solution (in particular in mineral acids), preferably after separation of the catalyst, although the 1,5-bisacetaminoheptanol-6 may first be isolated as a solid (Mp: 105° to 107° C.).

The next stage of the process according to the invention is directed to the hydrolysis (deacetylation, see DE-A 3,425,814) of the N-acetyl groups in aqueous, mineral acid solution to the corresponding salts of 1,5-diaminoheptanol-6 containing primary amino groups, for example in a 4 to 6 normal aqueous hydrochloric acid solution with 4 to 6 hours heating under reflux conditions. Subsequent concentration by evaporation and recrystallization yields purified salts of 1,5-diaminoheptanol-6. However, the pure, free amine may be directly separated as crude amine by treating concentrated aqueous solutions of the salts of 1,5-diaminoheptanol-6 with NaOH or KOH without initial isolation of the amine salt. Further purification may be obtained by distillation.

The 1,5-diaminoheptanol-6 according to this invention is a substance which is liquid at room temperature and shows no tendency to crystallize. Due to its method of preparation, it is a pure diamino compound with an additional, adjacent OH function which is not contaminated with unwanted monoamino compounds.

The 1,5-diaminoheptanol-6 according to the invention is a novel and special chain lengthening agent for the preparation of polyurethane polyureas plastics by the isocyanate polyaddition process, wherein chain lengthening may first be carried out via the two amino groups such that the OH function is available for further reactions.

It is already part of the prior art, for example, to subject dissolved polyurethane polyurea resins of a linear structure to a cross-linking reaction on a substrate by means of melamine- or urea-formaldehyde resins. The acceptor groups for the attack of the methylol groups of these resins are the NH groups from the urethane and urea groups of the polymer chain. The disadvantage of this cross-linking reaction, however, is that it generally requires high temperatures in the region of 150° to 170° C. for sufficiently stable results. The incorporation of hydrazine into the polymer chain or into amide groups in side positions (according to DE-A 2 457 387 or DE-A 3 345 071) has already provided the possibility of improving the stoving conditions. The incorporation of the substance according to the invention provides further progress in this direction. Appropriate polyurethane polyureas may be cross-linked with formaldehyde resins under very mild conditions. They are also highly reactive with polyisocyanates when NCO-inert solvent mixtures are used, and when mixed with a polyisocyanate they can be converted into cross-linked, i.e. chemically resistant films on any substrates such as metals, plastics, paper or wood.

The polyurethane polyureas are prepared by reacting an organic polyisocyanate, preferably a diisocyanate, with a high molecular weight polyol, preferably a diol and more preferably a polyester diol, having a molecular weight of 400 to about 10,000, and with a chain lengthening agent having a molecular weight below 400. In accordance with the present invention a portion or all of the chain lengthening agent is 1,5-diaminoheptanol-6.

The present invention will now be explained with the aid of the following examples. All percentages are percentages by weight.

EXAMPLES

EXAMPLE 1

(Preparation of 1,5-bisacetaminoheptanone-6)

1096 g of L-lysine hydrochloride were introduced in increments with stirring at 40° to 50° C. into a mixture of 3676 g of acetic acid anhydride, 2429 g of triethylamine and 2.4 g of N,N-dimethyl-4-aminopyridine. After about 80 liters of $CO_2$ had evolved, stirring was continued at 60° to 70° C. until a total of about 135 liters of $CO_2$ had been split off. The reaction mixture was filtered to remove precipitated triethylamine hydrochloride, the filtrate was freed from low boiling constituents by evaporation in a vacuum and the remaining crude product was crystallized from ethyl acetate. 1163 g of 1,5-bisacetaminoheptanone-6 melting at 108° to 110° C. were obtained.

EXAMPLE 2

(Preparation of 1,5-diaminoheptanol-6)

(a) 456 g of 1,5-bisacetaminoheptanone-6 were dissolved in 1.5 liters of water in a stirrer autoclave and 50 g of Raney nickel were added. Stirring was continued at 90° C. and a hydrogen pressure of 40 to 60 bar until uptake of hydrogen ceased. The pressure was then released, the catalyst was removed by filtration and the aqueous solution of 1,5-bis-acetaminoheptanol-6 was transferred directly to acid hydrolysis.

(b) 1.5 kg of 37% hydrochloric acid were added to the aqueous solution from (a) and the mixture was kept under reflux conditions for 6 hours and then freed from low boiling constituents in a vacuum. 480 g of a 50% sodium hydroxide solution were then added to the resulting crude product, 1,5-diaminoheptanol-6-bishydrochloride, with cooling. The sodium chloride formed in the reaction and excess sodium hydroxide solution were separated off and the isolated crude amine, which only contained nondistillable impurities and small quantities of water, was purified by distillation. 251 g of 1,5-diaminoheptanol-6, boiling at 113° to 115° C./0.1 mbar (yield 86%), were obtained.

| Analysis (%) | C | H | N |
|---|---|---|---|
| Found | 57.4 | 12.5 | 19.1 |
| Theory (based on $C_7H_{18}N_2O$) | 57.5 | 12.3 | 19.2 |

EXAMPLE 3

(Preparation of 1,5-diaminoheptanol-6-bishydrochloride)

The crude product, 1,5-diaminoheptanol-6-bishydrochloride, prepared as an intermediate in Example 2b was precipitated in 800 ml of isopropanol. The product was suction filtered, washed with a small quantity of isopropanol and dried. 416 g of 1,5-diaminoheptanol-6-bishydrochloride melting at 144° to 147° C. (decomposition) were obtained.

| Analysis (%) | C | H | N | Cl |
|---|---|---|---|---|
| Found | 38.2 | 9.3 | 12.8 | 32.0 |
| Theory (based on $C_7H_{18}N_2O \times 2HCl$) | 38.4 | 9.1 | 12.8 | 32.4 |

EXAMPLE 4

(Preparation of 1,5-diaminoheptanol-6)

438 g of the bishydrochloride of Example 3 were introduced in increments into 480 g of 50% sodium hydroxide solution with stirring and cooling with ice. The product was separated from the sodium chloride formed in the reaction and excess sodium hydroxide to leave a crude amine which according to gas chromatographic analysis contained no impurities in the high boiling range and only small quantities of water and salts. 265 g of 1,5-diaminoheptanol-6 were isolated by distillation.

EXAMPLE 5

The use of 1,5-diaminoheptanol-6 for the preparation of a polyurethane polyurea is described in this example.

An isocyanate prepolymer was prepared from 2550 g (1.0 mol) of a linear polyester of diethylene glycol and adipic acid (which has an OH number of 44), 333 g (1.5 mol) of 3,3,5-trimethyl-5-isocyanatomethylcyclohexylisocyanate and 84 g (0.5 mol) of 1,6-hexane diisocyanate by heating at 110° C. for 3 hours without solvent, and this prepolymer was dissolved in 1500 g of toluene. A solution of 146 g (1.0 mol) of 1,5-diaminoheptanol-6 from Example 2 in 600 g of isopropanol was added dropwise to this solution of prepolymer at 0° to 20° C. A viscous solution was obtained, which was adjusted to a concentration of about 50% by the further addition of 500 g of isopropanol and 500 g of methoxypropanol. The solution had a viscosity of 43,000 mPa.s/23° C. (solution L 1).

For comparison, an approximately 50% solution of a polyurethane urea was prepared from the same isocyanate prepolymer in the same solvents but with the use of an equimolar amount of ethylene diamine instead of the diamine according to the invention (solution L 2).

80 g of a formaldehyde-melamine resin (melamine-hexamethylol ether), dissolved to form a 50% solution in n-butanol, were added as cross-linking agent and 4.5 g of p-toluene sulphonic acid were added as catalyst to 1000 g of solutions L 1 and L 2.

The solutions were applied to separating paper by spread coating in amounts of 150 g/m$^2$ and heated at 120° C. for 15 minutes.

Soft but dry films were obtained. To test cross-linking, a wad of cottonwood impregnated with isopropanol was placed on the films for 5 minutes. The film from solution L 1 remained unchanged, while the film from solution L 2 became tacky and dissolved.

Because of the high reactivity of solution L 1 towards melamine formaldehyde resins demonstrated by this test, this solution is eminently suitable, in contrast to the comparison solution L 2, for use as a bonding agent for coatings and primers which are required to be cross-linked under mild conditions.

Since solutions of the polyurethane polyureas according to the invention can be cured at temperatures of 120° C. or even lower, an important improvement compared with the state of the art is obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. 1,5-diaminoheptanol-6 corresponding to the formula

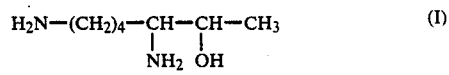
(I)

* * * * *